(12) United States Patent
Axel et al.

(10) Patent No.: US 9,477,017 B2
(45) Date of Patent: Oct. 25, 2016

(54) METHOD FOR STRUCTURING A NON-METAL OMNIDIRECTIONAL MULTILAYER MIRROR

(71) Applicants: Francoise Axel, Paris (FR); Jacques Peyriere, Paris (FR)

(72) Inventors: Francoise Axel, Paris (FR); Jacques Peyriere, Paris (FR)

( * ) Notice: Subject to any disclaimer, the term of this patent is extended or adjusted under 35 U.S.C. 154(b) by 0 days.

(21) Appl. No.: 14/557,200
(22) Filed: Dec. 1, 2014
(65) Prior Publication Data
US 2015/0085389 A1   Mar. 26, 2015

Related U.S. Application Data

(63) Continuation of application No. 13/139,792, filed as application No. PCT/FR2009/052544 on Dec. 15, 2009, now Pat. No. 8,928,979.

(30) Foreign Application Priority Data

Dec. 15, 2008  (FR) .................................... 08 07041

(51) Int. Cl.
| | | |
|---|---|---|
| G02B 1/10 | (2015.01) | |
| G02B 5/28 | (2006.01) | |
| G02B 5/20 | (2006.01) | |
| G02B 5/08 | (2006.01) | |
| F21V 9/04 | (2006.01) | |
| F21V 9/06 | (2006.01) | |
| B82Y 20/00 | (2011.01) | |
| G02B 27/00 | (2006.01) | |

(52) U.S. Cl.
CPC ............ G02B 5/0816 (2013.01); B82Y 20/00 (2013.01); G02B 5/0825 (2013.01); G02B 5/285 (2013.01); G02B 27/0012 (2013.01)

(58) Field of Classification Search
CPC .. G02B 5/0816; G02B 5/0825; G02B 5/285; G02B 27/0012; B82Y 20/00
USPC .................................................. 359/577–584
See application file for complete search history.

(56) References Cited

U.S. PATENT DOCUMENTS

| | | | | |
|---|---|---|---|---|
| 6,130,780 A | * | 10/2000 | Joannopoulos et al. | 359/584 |
| 6,208,466 B1 | * | 3/2001 | Liu et al. | 359/584 |
| 7,880,161 B2 | * | 2/2011 | Mears et al. | 257/9 |
| 7,903,246 B2 | * | 3/2011 | Dal Negro et al. | 356/301 |
| 8,064,127 B2 | * | 11/2011 | Steinhardt | B82Y 20/00 252/501.1 |
| 8,110,425 B2 | * | 2/2012 | Yun | 438/47 |
| 8,329,247 B2 | * | 12/2012 | Banerjee | G02B 27/0012 427/10 |
| 8,861,087 B2 | * | 10/2014 | Banerjee | G02B 5/0833 359/359 |
| 9,229,140 B2 | * | 1/2016 | Banerjee | G02B 5/281 |
| 2003/0085652 A1 | * | 5/2003 | Weaver | 313/506 |
| 2005/0266218 A1 | * | 12/2005 | Peumans et al. | 428/216 |
| 2012/0229905 A1 | * | 9/2012 | Axel et al. | 359/584 |

OTHER PUBLICATIONS

L. Dal Negro, M. Stolfi, Y. Yi, J. Michel, X. Duan, L. C. Kimerling, J. LeBlanc, and J. Haavisto. Photon band gap properties and omnidirectional reflectance in Si/Si O 2 Thue-Morse quasicrystals. Applied Physics Letters 84, 5186 (2004); doi: 10.1063/1.1764602.*
X. Wang, U. Grimm, and M. Schreiber. Trace and antitrace maps for aperiodic sequences, their extensions and applications. Phys. Rev. B 62, 14020 (2000).*
N. Liu. Propagation of light waves in Thue-Morse dielectric multilayers. Phys. Rev. B 55, 3543 (1997).*

* cited by examiner

Primary Examiner — Bumsuk Won
Assistant Examiner — Collin X Beatty
(74) Attorney, Agent, or Firm — David R. Stevens; Stevens Law Group

(57) ABSTRACT

A method for structuring an omnidirectional non-metal mirror for any predetermined wavelength or range of wavelengths. The mirror having at least two layers of different non-metal materials, with an elementary matrix associated to each layer, including physical parameters of the layer and parameters of the light passing through the layer.

19 Claims, 1 Drawing Sheet

METHOD FOR STRUCTURING A NON-METAL OMNIDIRECTIONAL MULTILAYER MIRROR

FIELDS OF THE INVENTION

The present invention pertains to a method for structuring an "omnidirectional" non-metallic mirror, that is to say one which reflects light for any angle of incidence, comprising several layers and that can be implemented by a computer.

The present invention also pertains to an omnidirectional non-metallic mirror obtained by this method and comprising several layers.

Such a mirror is also called an omnidirectional heterostructure multilayer non-metallic mirror.

The invention finds application in all cases where an omnidirectional non-metallic mirror may be employed. For example and non-limitingly, the invention finds application in respect of waveguides, lasers, or more generally in the optics field: in the waveguide field, it is especially beneficial to have a guide whose walls best reflect the incident light so as to limit the in-line losses in the guide, and to do so whatever the angle of incidence of the light arriving at the walls of the guide.

DESCRIPTION AND ASSESSMENT OF THE PRIOR ART

Mirrors such as they are familiar to us and known and used from the earliest antiquity are metallic, whether this be throughout the mass, made of metal, or whether a thin metallic layer is affixed to another material (glass). But for certain wavelength spans of light, not visible but of great technological interest, they absorb an appreciable fraction of the incident light. It is to avoid this difficulty in particular that it has been sought to manufacture dielectric mirrors, and also that interest in stacks of non-metallic thin layers has developed.

A multilayer non-metallic mirror comprises two or more layers that may differ in their composition and/or their thickness and in the prior art, usually, forming a base structure repeated several times in a periodic arrangement.

But such a mirror can also consist of two or more of these layers repeated according to non-periodic substitutive sequences. One then speaks of an aperiodic heterostructure. This heterostructure which constitutes the mirror is endowed with a surface on which the refractive index is practically constant, whereas it varies perpendicularly to this surface.

The heterostructure may be obtained with the help of a single substitutive sequence, in such a way that each layer is a simple layer of a single material. It may be obtained with the help of just one substitutive sequence, in such a way that each layer is the assemblage of elementary layers which themselves have a structure. Finally, the heterostructure may be obtained with the help of several substitutive sequences, in such a way that it consists of several subsets of layers, each layer being obtained through a substitutive sequence.

Two well known examples of such substitutive sequences are the Fibonacci sequence, which is quasiperiodic, or the Thue-Morse sequence, which is non-quasiperiodic.

In the prior art, it is known how to determine the behavior of such a heterostructure in relation to light, for a given wavelength $\lambda$ and a given angle of incidence $\theta$, in the two fundamental modes termed "transverse electric" (TE), and "transverse magnetic" (TM). In the TE mode, the electric field of the light is polarized perpendicularly to the plane of incidence. In the TM mode, the magnetic field of the light is polarized perpendicularly to the plane of incidence. The plane of incidence is defined by the incident ray and the perpendicular to the plane of the multilayer. Any incident radiation is completely described on the basis of these two modes, TE and TM.

Useful details may be found in the following documents:

D1: F. Abelès, Annales de Physique vol. 5 (1950) 596-640 and 707-782, Recherche sur la propagation des ondes électromagnétiques sinusoïdales dans les milieux stratifiés. Application aux couches minces [Research on the propagation of sinusoidal electromagnetic waves in stratified media. Application to thin layers], D2: "Principles of Optics", M. Born, E. Wolf, 7th edition 1999, Cambridge University Press, D3: Photonic Crystals, J. D. Joannopoulos, R. D. Meade, J. N. Winn, Princeton U. P. Publisher 1995.), (D4): Optical waves in layered media, P. Yeh, John Wiley and sons, publisher.

The appropriate solution of Maxwell's Equations which governs the propagation takes the form in this stratified medium of a 2×2 matrix termed the "transfer matrix" $M_N$, which relates the properties of light in the entrance plane of the multilayer and in the exit plane, and which is itself the product of N elementary transfer matrices $S_j$ each characterizing the properties of light in the entrance and exit plane of each of the N layers which constitute the heterostructure.

In the frequent case of two types of different layers, denoted by a and b, the elementary matrices $S^a$, $S^b$, characterizing a layer j (j from 1 to N), have the form:

$$S^a = \begin{pmatrix} \cos(2\pi n_a d_a \cos(\theta_a)/\lambda) & (1/p_a)\sin(2\pi n_a d_a \cos(\theta_a)/\lambda) \\ p_a \sin(2\pi n_a d_a \cos(\theta_a)/\lambda) & \cos(2\pi n_a d_a \cos(\partial 4_a)/\lambda) \end{pmatrix} \quad (R1)$$

where:
$\lambda$ is the wavelength of the incident light.
$n_a$ is the refractive index of layer a,
$d_a$ is the thickness of layer a,
$\theta_a$ is the angle of refraction in layer a,
and either $p_a = n_a \cdot \cos(\theta_a)$ when considering the fundamental mode termed "transverse electric" (TE) for which the electric field is polarized perpendicularly to the plane of incidence,
or $p_a = \cos(\theta_a)/n_a$ when considering the fundamental mode termed "transverse magnetic" (TM) for which the magnetic field is polarized perpendicularly to the plane of incidence, The same goes for the layer of type b on replacing the index a by the index b everywhere in (R1).

The transfer matrix of the heterostructure $M_N$, is then:

$$M_N = S_N S_{N-1} S_{N-2} \ldots S_2 S_1 \quad (R2)$$

To calculate $M_N$, in the prior art, the elementary transfer matrices were therefore multiplied directly to obtain the transfer matrix of the heterostructure, and if the latter had N layers, then N−1 multiplications of elementary transfer matrices were performed.

It has also been shown in an earlier work devoted specially to the case of the Fibonacci sequence (D5: M. Kohmoto, B. Sutherland, K. Iguchi, Phys. Rev. Lett. 58 (1987) 2436 Localization in Optics: quasiperiodic media.), but this result is general, that the transmission coefficient T of the heterostructure is expressed in a simple manner as a function of the sum of the squares of the elements of $M_N$ which are themselves expressed in a very simple manner as a function of the trace $TrM_n$, which is the sum of its two diagonal elements, and of the "antitrace" $aTrM_n$ which is the difference of its two non-diagonal elements. We have $$T = \frac{4}{((TrM_n)^2 + (aTrM_n)^2)} \quad (R3)$$

The transmission coefficient T which is the ratio of the transmitted intensity to the incident intensity therefore equals zero in the case of a mirror.

In the prior art also, methods are known for generating deterministic sequences by means of substitutive algorithms.

A substitution a operates on an alphabet A of k letters denoted by $a_1, a_2, \ldots, a_k$ (when k=2, the letters will often be denoted a and b instead of $a_1$ and $a_2$, when k=3, the letters will often be denoted a, b and c). A word on the alphabet A is a finite sequence (which may be empty) of letters of this alphabet. For each letter u of the alphabet A there is a word, denoted $\sigma_u$, composed of letters of this alphabet. This is what is called substitution on the alphabet A.

If now $w=u_1u_2\ldots u_l$ is a word where the $u_j$ are the letters, the word obtained by abutting the words $\sigma_{u1}, \sigma_{u2}, \ldots, \sigma_{uk}$ in the order in which they occur will be denoted $\sigma(w)$. We say that the substitution $\sigma$ has been applied ("mapped") to the word w. If $\sigma$ is applied to the word $\sigma(w)$, we obtain a word denoted $\sigma^2(w)$, and so on and so forth. By convention, we put $\sigma^0(w)=w$.

In mathematical terms, a substitution on A is an endomorphism of the free monoid generated by A.

To illustrate what is meant by a substitutive sequence and also the methods to which it gives rise, three examples are provided hereinbelow.

In a first example, a substitutive sequence is constructed with an alphabet A of two letters a and b. The two letters a and b can represent two layers of a heterostructure that may differ in their composition and/or their thickness. We define the two words of the substitution: aab and ba. We start from the word $w_0=a$. The substitution $\sigma$ applied to the word $w_0$ then consists in replacing each letter a by the substitution word aab and each letter b by the substitution word ba. We thus obtain the word $$w_1 = \sigma(w_0) = aab.$$

If this substitution operation is iterated by replacing, in $w_1$, the letters a by the word aab=$\sigma_a$ and the letters b by the word ba=$\sigma_b$, we then obtain the word $$w_2 = \sigma(w_1) = \sigma^2(w_0) = aabaabba$$

Next, if the operation is repeated once again, we obtain $$w_3 = \sigma(w_2) = \sigma^3(w_0) = aabaabbaaabaabbabaaab.$$

The substitution operation can be repeated several times in succession using this principle.

In a second example, a substitutive sequence is constructed with an alphabet A comprising three letters a, b and c. The three letters a, b and c can represent three layers of a heterostructure that may differ in their composition and/or their thickness. Three substitution words are formed: ab, bc and ac. We start from the word $w_0=a$. The substitution $\sigma$ applied to the word $w_0$ then consists in replacing each letter a by the substitution word ab=$\sigma_a$, each letter b by the substitution word bc=$\sigma_b$ and each letter c by the substitution word ac=$\sigma_c$. Starting from $w_0=a$, we thus obtain by successive substitutions:

$$w_1 = \sigma(w_0) = ab$$
$$w_2 = \sigma(w_1) = \sigma^2(w_0) = abbc$$
$$w_3 = \sigma(w_2) = \sigma^3(w_0) = abbcbcac$$
$$w_4 = \sigma(w_3) = \sigma^4(w_0) = abbcbcacbcacabac$$
$$etc\ldots$$

In the two examples illustrated hereinabove, each word $w_{n-1}$ is a prefix of the word $w_n$. Indeed, the word $w_{n-1}$ is found at the start of the word $w_n$. Such is not always the case as is shown by the third example.

In this third example, a substitutive sequence is constructed with an alphabet A reduced to the two letters a and b. The two letters a and b can represent two layers of a heterostructure that may differ in their composition and/or their thickness. Two substitution words are formed: bab and ab. We start from the word $w_0=a$. The substitution $\sigma$ applied to the word $w_0$ then consists in replacing each letter a by the substitution word bab=$\sigma_a$, and each letter b by the word ab =$\sigma_b$. Starting from $w_0=a$, we thus obtain by successive substitutions:

$$w1 = \sigma(w_0) = bab$$
$$w2 = \sigma(w_1) = \sigma^2(w_0) = abbabab$$
$$w3 = \sigma(w_2) = \sigma^3(w_0) = bababbabbabbabab$$
$$w4 = \sigma(w_3) = \sigma^4(w_0) =$$
$$abbababbabbabbababbabbabbabbababbabbabab$$
$$etc\ldots$$

With each substitution $\sigma$ is associated a matrix $M_\sigma$, which, for the three examples mentioned hereinabove, this matrix may be written, respectively:

$$M_{\sigma, example\ 1} = \begin{pmatrix} 2 & 1 \\ 1 & 1 \end{pmatrix}; M_{\sigma, example\ 2} = \begin{pmatrix} 1 & 0 & 1 \\ 1 & 1 & 0 \\ 0 & 1 & 1 \end{pmatrix} \text{ and } M_{\sigma, example\ 3} = \begin{pmatrix} 1 & 1 \\ 2 & 1 \end{pmatrix}$$

Indeed, for the first example, the substitution $\sigma_a$=aab operated on the letter a causes the letter a to appear twice and the letter b to appear once, hence the coefficients of the first column of the matrix $M_{\sigma,\ example\ 1}$. Moreover, the substitution $\sigma_b$=ba operated on the letter b causes the letter b to appear once and the letter a to appear once, hence the coefficients of the second column of the matrix $M_{\sigma,\ example\ 1}$.

For the second example, the substitution $\sigma_a$=ab operated on the letter a causes the letter a to appear once and the letter b to appear once, but does not cause the letter c to appear, hence the coefficients of the first column of the matrix $M_{\sigma,\ example\ 2}$. The substitution $\sigma_b$=bc operated on the letter b causes the letter b to appear once and the letter c to appear once, but does not cause the letter a to appear, hence the coefficients of the second column of the matrix $M_{\sigma,\ example\ 2}$. Finally, the substitution $\sigma_c$=ac operated on the letter c causes the letter a to appear once and the letter c to appear once, but does not cause the letter b to appear, hence the coefficients of the third column of the matrix $M_{\sigma,\ example\ 2}$.

For the third example, the substitution $\sigma_a$=bab operated on the letter a causes the letter a to appear once and the letter b to appear twice, hence the coefficients of the first column of the matrix $M_{\sigma,\ example\ 1}$. Moreover, the substitution $\sigma_b$=ab operated on the letter b causes the letter a to appear once and the letter b to appear once, hence the coefficients of the second column of the matrix $M_{\sigma,\ example\ 3}$.

This type of matrix possesses the following properties:
the matrix $M_\sigma$ comprises a positive eigenvalue $\rho>1$ and greater than the modulus of each of the other eigenvalues of this matrix $M_\sigma$. For the three examples mentioned hereinabove, the eigenvalue $\rho$ thus defined corresponds respectively to the values:

$$\rho_{example,1}=(3+\sqrt{5})/2,$$

$$\rho_{example,2}=2 \text{ and } \rho_{example,3}=1+\sqrt{2}.$$

the length $l_n$ of the word $w_n=\sigma^n(w_0)$, obtained after n substitutions of a substitutive sequence $\sigma$ starting from the word $w_0$, is of the order of $\rho^n$.

Thus, for the first example, the lengths (number of letters in a word) of the words $w_0$, $w_1$, $w_2$, $w_3$, $w_4$, $w_5$, $w_6$, $w_7$, $w_8$, $w_9$, $w_{10}$, $W_{11}$, $W_{12}$ etc. equal respectively 1, 3, 8, 21, 55, 144, 377, 987, 2584, 6765, 17 711, 46 368, 121 393, etc.

For the second example, the lengths of the words $w_0$, $w_1$, $w_2$, $w_3$, $w_4$, $w_5$, $w_6$, $w_7$, $w_8$, $w_9$, $w_{10}$, etc. equal respectively 1, 2, 4, 8, 16, 32, 64, 128, 256, 512, 1024, etc.

For the third example, the lengths of the words $w_0$, $w_1$, $w_2$, $w_3$, $w_4$, $w_5$, $w_6$, $w_7$, $w_8$, $w_9$, $w_{10}$, etc. equal respectively 1, 3, 7, 17, 41, 99, 239, 577, 1393, 3363, 8119, etc.

It is therefore understood that the length $l_n$ of the word $w_n$ increases very rapidly with the number n of substitutions operated.

This implies that the number of layers N forming a heterostructure, for example intended to form a multilayer non-metallic mirror, increases very rapidly with the number n of iterations operated, more precisely as the quantity $\rho^n$. Now, the transmission coefficient T is obtained, in the prior art, by directly calculating the product of the N transfer matrices describing the propagation of light in the multilayer, and if it were desired to structure such a mirror consisting of a non-periodic heterostructure, exhibiting particular properties with a view to a given application, the quantity of calculations required to define the structure of the mirror would quickly become prohibitive: it is necessary, indeed, to perform numerous calculations to test the respective influence of each independent physical parameter on the transmission coefficient of the mirror.

Furthermore, the use of the technique which consists in directly multiplying the transfer matrices presents the drawback of giving rise, at each step of the calculation, done by means of a computer, that is to say at each additional multiplication of an elementary transfer matrix with the preceding ones, to cumulative rounding errors which can rapidly deprive the calculation performed of validity. It is therefore not even certain that the calculation performed is sufficiently reliable.

For these reasons, solutions making it possible to circumvent these drawbacks have already been sought in the prior art.

One track followed has been to decrease the number of independent physical parameters involved in the structuring of the multilayer non-metallic mirror. This is, for example, what was proposed by the document U.S. Pat. No. 6,903,873 B1 by Joannopoulos et al. of 7 Jun, 2005. (D6) which describes a periodic stack of layers.

D6 presents a method for obtaining a multilayer non-metallic mirror with a periodic arrangement of two types of layers, whose thicknesses are inter-related by an equation presented by the authors as having to optimize the reflection.

The track proposed in D6 therefore starts from the principle that it is useful to employ a periodic structure, whose individual thicknesses favor reflection at normal incidence. Thus for example, thicknesses $d_a$, $d_b$ used for the layers a, b are "quarter-wave", that is to say such that $d_a=\lambda/4n_a$ and $d_b=\lambda/4n_b$ respectively, where $\lambda$ is the wavelength of the incident light.

The procedure according to D6 thus makes it possible to decrease the number of physical parameters involved in the calculations, and therefore, the computer calculation time required for structuring a mirror adapted for a given application.

Furthermore, by fixing a restricted number of layers for the mirror, the calculation error remains acceptable.

This procedure presents the major drawback of considerably restricting the possibilities of structuring a non-metallic mirror for a given specific application.

Indeed, the thickness of each layer of the mirror and the nature of the materials of these layers are imposed. Moreover, the number of periodic units of the sample is limited so as to avoid calculation errors, and the structure is necessarily periodic.

To improve its procedure, D6 suggests that the structure may be non-periodic. However, D6 does not describe any calculation procedure for achieving reliable and fast production of an omnidirectional mirror composed of a non-periodic heterostructure.

In the few accessible published works on this part of the prior art, Dal Negro et al., (D7: L. Dal Negro, M. Stolfi, Y. Yi, J. Michel, X. Duan, L. C. Kimerling, J. LeBlanc, J. Haavisto, Appl. Phys. Lett. 84, (2004) 5186, Photon band gap properties and omnidirectional reflectance in Si/SiO2 Thue-Morse quasicrystals.) who work with a multilayer, admittedly non-periodic, are not capable of structuring the omnidirectional mirrors that they have demonstrated by choosing the wavelength span of the light in which said mirrors are reflecting, especially because, from the outset, they restricted the thicknesses to "quarter-wave" values.

SUMMARY OF THE INVENTION

The subject of the invention is a method for structuring an omnidirectional non-metallic mirror in an arbitrary but predetermined range of angles of incidence and for an arbitrary but predetermined wavelength or wavelength span, comprising the following steps:

A) a structure is defined, comprising at least two layers of different non-metallic materials, with each of which is associated an elementary matrix incorporating physical parameters of the layer, especially the thickness and the refractive index, and parameters of the light passing through said layer, especially the wavelength and the angle of incidence;

B) with the help of a substitutive sequence repeated n times, a structure is generated which is defined by a number (N) of layers, by the arrangement of these layers and the physical parameters of each layer of the elementary matrices;

C) the product of the elementary matrices is calculated by means of a block-wise recurrence and according to their arrangement, so as to obtain a matrix representative of the structure defined in step B), with the help of which the transmission coefficient (T) of said structure is calculated;

D) the transmission coefficient (T) obtained is compared with a threshold value ($T_{thresh}$) chosen as a function of the envisaged use of the omnidirectional mirror, and:
- if the transmission coefficient (T) is below the threshold value ($T_{thresh}$) at the wavelength or over the span of wavelengths considered and for the span of angles of incidence considered, the structure is an omnidirectional mirror over this span of angles of incidence;
- if the transmission coefficient (T) is above the threshold value ($T_{thresh}$) at the wavelength or over the span of wavelengths considered and for a span of angles of incidence considered, steps B) to D) are repeated, while varying the number of layers, their arrangement and/or at least an arbitrary one of the physical parameters of the layers.

According to other embodiments:

it is possible to define, during step A), a structure comprising k layers $a_j$ with $1 \leq j \leq k$ of different non-metallic materials, with each of which is respectively associated an elementary matrix $A_j$ with $1 \leq j \leq k$ incorporating physical parameters of the layer, and parameters of the light passing through said layer, and, in order to obtain the matrix of step C), use is made of recurrence relations relating the matrix $A_{J, n+1}$ in the guise of linear combination of the unit matrix I of order 2, and matrices $A_{J,n}$ in which the coefficients of these relations are polynomials dependent on the traces of the matrices $A_{J, n}$ where: $J=(j_1, j_2, \ldots, jv)$ such that $1 \leq j \leq k$ and $1 \leq j_1 < j_2 << j_v \leq k$, and $A_{j, n} = A_{j1, n} A_{j2, n} \ldots A_{jv, n}$ is the matrix obtained after n repetitions of the substitutive sequence on the matrix $A_j$ for $1 > j \leq k$;

if k=2, it is possible to define during step A), a structure comprising two layers $a_1$=a, $a_2$=b of different non-metallic materials, with each of which is respectively associated an elementary matrix $A_1$=A, $A_2$=B incorporating physical parameters of the layer, and parameters of the light passing through said layer, then, to obtain the matrix of step C), the following recurrence relations are used:

a. $A_{n+1} = N_{\sigma,1,1}(TrA_n, TrB_n, TrA_nB_n) \times I + N_{\sigma,1,2}(TrA_n, TrB_n, TrA_nB_n)A_n + N_{\sigma,1,3}(TrA_n, TrB_n, TrA_nB_n)B_n + N_{\sigma,1,4}(TrA_n, TrB_n, TrA_nB_n)A_nB_n$ (R1)

b. $B_{n+1} = N_{\sigma,2,1}(TrA_n, TrB_n, TrA_nB_n) \times I + N_{\sigma,2,2}(TrA_n, TrB_n, TrA_nB_n)A_n + N_{\sigma,2,3}(TrA_n, TrB_n, TrA_nB_n)B_n + N_{\sigma,2,4}(TrA_n, TrB_n, TrA_nB_n)A_nB_n$ (R2)

$A_{n+1}B_{n+1} = N_{\sigma,3,1}(TrA_n, TrB_n, TrA_nB_n)I + N_{\sigma,3,2}(TrA_n, TrB_n, TrA_nB_n)A_n + N_{\sigma,3,3}(TrA_n, TrB_n, TrA_nB_n)B_n + N_{\sigma,3,4}(TrA_n, TrB_n, TrA_nB_n)A_nB_n$ (R3)

where:
the matrix I is the unit matrix of order 2,
the matrix $N_\sigma$ is a 3×4 matrix, associated with the substitutive sequence σ and whose coefficients $N_{\sigma,i,j}$ (with $1 \leq i \leq 3$ and $1 \leq j \leq 4$) are polynomials of three variables x, y and z with integer coefficients, and
$TrA_n$, $TrB_n$, and $TrA_nB_n$ are, respectively, the trace of the matrix $A_n$, the trace of the matrix $B_n$, and the trace of the matrix $A_nB_n$;
it is possible to associate a trace mapping with the block-wise recurrence in the course of step C);
it is possible to calculate the transmission coefficient T of the matrix obtained in step C) through the formula:

$$T = \frac{4}{((TrA_n)^2 + (aTrA_n)^2)}$$

where $TrA_n$ is the trace of the matrix obtained in step C), and $aTrA_n$ its antitrace;

the structure of step B) may be obtained with the help of a single substitutive sequence, each non-metallic material layer being a simple layer made of a single material;

the structure of step B) may be obtained with the help of a single substitutive sequence applied to a set of layers, in which each layer is itself an assemblage of simple layers, each layer being made of a single material; and/or the structure of step B) may be obtained with the help of several substitutive sequences, so that the structure is formed of several subsets of simple layers, each made of a single material, each subset being obtained through a substitutive sequence, the assemblage of the subsets being obtained through another substitutive sequence.

The invention also pertains to an omnidirectional non-metallic mirror for a wavelength or an arbitrary but predetermined span of wavelengths, obtained by the previous structuring method, comprising at least two layers of different non-metallic materials.

In the previous non-metallic mirror, the layers are stacked in a non-periodic manner.

An objective of the invention is to propose a method for structuring an omnidirectional non-metallic mirror for a wavelength or an arbitrary but predetermined range of wavelengths, in which no prior constraint on the physical parameters involved in this structuring is effected.

The arrangement of layers in accordance with a substitutive sequence so as to constitute a structure, optionally reflecting, makes it possible to much more "economically" calculate the optical properties and the reflecting capabilities thereof in terms of transfer matrices, and to do so for a given wavelength and a given incidence—by means of a recurrence formula, the BBR ("Building Block Recurrence" as it is known), following directly from the substitutive sequence.

The invention proposes to implement this technique called block-wise recurrence (BBR).

This method may be implemented by computer.

Let us take the first example hereinabove, where σ(a)=aab σ(b)=ba. We start from the word $w_0$=a. We have seen that $w_1 = \sigma(w_0) = aab$.

$w_2 = \sigma(w_1) = \sigma^2(w_0) = aabaabba$ $w_3 = \sigma(w_2) = \sigma^3(w_0) = aabaabbaaabaabbabaaab$.

and so on and so forth.

If a corresponds to a layer of a certain material, there corresponds thereto an elementary 2×2 "transfer matrix", i.e. A, likewise the matrix B for the layer b, which relates the properties of the light in the entrance plane of the layer and in the exit plane.

If we put $A_0$=A, $B_0$=B and we define by recurrence $A_{n+1} A_n B_n$ and $B_{n-1} = B_n A_n$, we see that to calculate $A_{n+1}$ and $B_{n+1}$ knowing $A_n$ and $B_n$ we had to perform 3 products of 2×2 matrices. Therefore to calculate $A_n$ and $B_n$, it suffices to perform 3n products of 2×2 matrices. Obviously, the matrix $A_n$ is the transfer matrix of the heterostructure corresponding to the word $w_n$. If, for example, n=7, the matrix is the product of 987 products of elementary matrices. It is therefore seen that in this case, the naive calculation of 986 products of 2×2 matrices has been replaced by the calculation of 7×3=21 products of such matrices. We are said to have effected a product by block-wise recurrence (known as Building Block Recurrence or BBR).

In the general case of a substitution σ on an alphabet A, the previous naive calculation of the transfer matrix of the heterostructure obtained after n iterations requires of the order of $\rho^n$ products of 2×2 matrices, whereas the use of the BBR requires of the order of only n products.

This therefore shows the entire benefit of considering such structures. Indeed, to determine a heterostructure corresponding to the sought-after specifications, it will be necessary, in order to test a large number of substitutions (there are 900 of them of length less than or equal to 4 on an alphabet of two letters) to calculate the transfer matrix both in the TE case and TM case for the wavelengths concerned, with a sufficiently fine sampling of the angle of incidence.

Only the BBR, by critically reducing the time and the number of calculations, makes it possible to achieve such an objective in a reliable manner.

It remains to define the value of the transmission coefficient $T_{thresh}$ with the help of which it is considered that a mirror has been manufactured. Normally T=0 for perfect reflection. But the value $T_{thresh}$ can depend on the envisaged use, for example, for certain applications, 0.02, or even 0.05 will be adequate.

An objective of the invention is thus to propose a method for structuring an omnidirectional non-metallic mirror for a wavelength or an arbitrary but predetermined range of wavelengths, in which no prior constraint on the physical parameters involved in this structuring is effected.

To achieve this objective, the invention proposes the method for structuring an omnidirectional non-metallic mirror comprising the following steps:

A) a base structure is defined, comprising at least two layers of different non-metallic materials, a and b, with each of which is associated an elementary matrix incorporating physical parameters of the layer, especially the thicknesses and refractive indices $d_a$, $d_b$, $n_a$, and $n_b$, and parameters of the light passing through said layer, especially the wavelength λ and the angle of incidence θ.

B) with the help of this base structure and of a substitutive sequence σ applied n times, another structure is generated, defined
  by the number N of its layers,
  by the arrangement of these layers as determined by the iterations of σ and
  by the physical parameters of each layer of the elementary matrices as in A and in which with each layer j (j from 1 to N) is associated its transfer matrix $S_j$ incorporating the physical characteristics of the layer considered (thickness, refractive index) and the characteristics of the light passing through it (wavelength, angle of incidence, TE or TM mode)

C) a computer is used to calculate the product (with reference to R2)

$$M_N = S_N\, S_{N-1}\, S_{N-2} \ldots S_2\, S_1$$

of the elementary matrices for each value of the parameters (θ, λ, $d_a$, $d_b$, $n_a$, and $n_b$), but by means of the block-wise recurrence defined by σ and according to their arrangement by means of the BBR to obtain the transfer matrix $M_N$ of the structure defined in step B), with the help of which its transmission coefficient T is calculated (with reference to R3): through the formula:

$$T = \frac{4}{((TrA_n)^2 + (aTrA_n)^2)}$$

where $TrM_N$ is the trace of the matrix $M_N$ (with reference to R2), obtained in step C), and $aTrM_N$ its antitrace.

D) the transmission coefficient T obtained is compared with a threshold value $T_{thresh}$ chosen as a function of the envisaged use of the omnidirectional mirror, and:
  if the transmission coefficient T is below the threshold value $T_{thresh}$, for any angle of incidence, at the wavelength (or over the span of wavelengths considered), for the TE mode and for the TM mode, the structure is an omnidirectional mirror.
  if the transmission coefficient T is above the threshold value $T_{thresh}$ for at least one angle of incidence, at the wavelength or over the span of wavelengths considered, either for the TE mode, or for the TM mode, one does not have a mirror, and it is necessary to repeat steps C) and D), while varying the number of layers, their arrangement and/or at least an arbitrary one of the physical parameters of the layers in accordance with A), or else, it is necessary to define another heterostructure during step B)

Now, to define it, it is possible to choose without restriction the number and the nature of base layers of the heterostructure according to A), the nature of the substitutive sequence, or else the number of substitutions applied to this sequence according to B).

The calculations must therefore be repeated until a structure forming a mirror with reference to FIG. 1 is obtained.

It follows from the above that the invention is also capable of achieving the following weaker objective: structuring of a mirror which reflects only for a predefined limited span of angle of incidence of the light, that is to say, for example for θ lying between $θ_1$ and $θ_2$ (where $θ_1$ and $θ_2$ are themselves between 0° and 90°) instead of reflection occurring for all values of the angle of incidence from 0° to 90°.

Step D) of the method then takes place as follows:
D) the transmission coefficient T obtained is compared with a threshold value $T_{thresh}$ chosen as a function of the envisaged use of the omnidirectional mirror, and:
  if the transmission coefficient T is below the threshold value $T_{thresh}$, for any angle of incidence θ lying between $θ_1$ and $θ_2$, at the wavelength or over the span of wavelengths considered, for the TE mode and for the TM mode, the structure is a mirror for the light having an angle of incidence θ lying between $θ_1$ and $θ_2$.
  if the transmission coefficient T is above the threshold value $T_{thresh}$ for at least one angle of incidence θ lying between $θ_1$ and $θ_2$, at the wavelength or over the span of wavelengths considered, either for the TE mode, or for the TM mode, one does not have a mirror, and it is necessary to repeat steps C) and D), while varying the number of layers, their arrangement and/or at least an arbitrary one of the physical parameters of the layers in accordance with A), or else, it is necessary to define another heterostructure during step B)

BRIEF DESCRIPTION OF THE DRAWINGS

In FIG. 2, the structure is reflecting in an omnidirectional manner for the span of wavelengths lying between 518 nanometers and 531 nanometers.

DETAILED DESCRIPTION OF THE INVENTION WITH EXAMPLE

Figure 1:
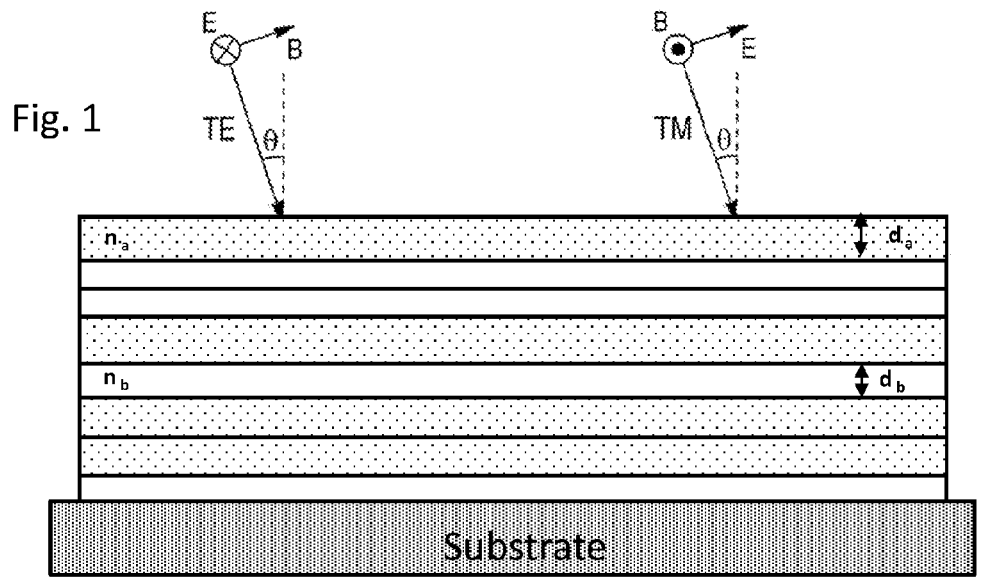
FIG. 1 is a simplified diagram of a reflecting aperiodic heterostructure according to the invention composed of two types of layers a and b of thicknesses $d_a$, $d_b$ and of respective indices $n_a$, $n_b$ lying on a substrate with the indication of the conventions for the electric and magnetic fields E and B of the light for the TE and TM modes.
Figure 2:
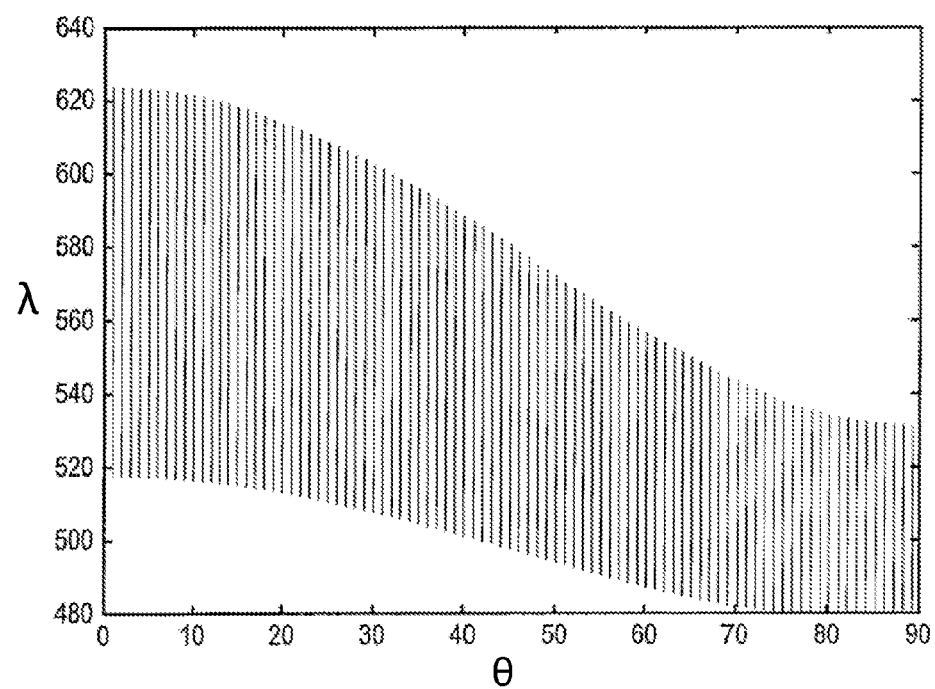
FIG. 2 is the chart, for the example of the sequence $\sigma(a)=aab$, $\sigma(b)=ba$ of the wavelength $\lambda$ as a function of the angle $\theta$ of incidence of the light for a structure defined by its fundamental parameters: $d_a=28$ nanometers, $d_b=34$ nanometers, $n_a=3.2$ and $n_b=1.6$ and 4 iterations. The hatched part indicates the regions in which the transmission coefficient T calculated (with reference to R3) is less than the imposed threshold $T_{thresh}$, here 0.01.

The invention proposes to implement the technique called block-wise recurrence (or which may be referred to as "Building Block Recurrence" as it is called, or BBR).

This method may be implemented by computer.

The BBR procedure is illustrated here for the substitutive sequence on an alphabet of 2 letters a and b, generated by the substitution $\sigma$ defined in the first example hereinabove, and in which $\sigma(a)=aab$ and $\sigma(b)=ba$. The two letters a and b are representative of layers of a heterostructure that may differ from one another in their composition and/or their thickness.

Let us consider two square matrices A and B, of order 2 and of determinant 1. If in the word $\sigma^j(a)$, each occurrence of a is replaced by A and each occurrence of b by B, we obtain a product of matrices whose result is denoted $A_j$. Likewise, if these substitutions are made in $\sigma^j(b)$, a matrix $B_j$ is obtained. Stated otherwise, with the layer a may be associated a matrix $A_0$ incorporating each of the physical parameters of the layer, especially the thickness and the refractive index, and parameters of the light passing through said layer. In an analogous manner, there may be associated with the layer b a matrix $B_0$ incorporating each of the physical parameters of the layer, especially the thickness and the refractive index, and parameters of the light passing through said layer. If $A_n$ and $B_n$ designate the matrices obtained after n iterations of the substitution $\sigma$, the BBR makes it possible to simply calculate, and without calculation approximation, the matrices $A_{n+1}$ and $B_{n+1}$, when $A_n$ and $B_n$ are known: thus, in the case where $\sigma(a)=aab$ and $\sigma(b)=ba$, we have $$A_{n+1} = A_n A_n B_n$$

and $$B_{n+1} = B_n A_n.$$

It is possible to further improve this recurrence in the following manner. The matrices $A_{n+1}$ and $B_{n+1}$ are linear combinations of the matrices I (unit matrix of order 2), $A_n$ and $B_n$.

This recurrence relation may be written:

$$A_{n+1} = N_{\sigma,1,1}(x_n, y_n, z_n) \times 1 + N_{\sigma,1,2}(x_n, y_n, z_n)A_n + \qquad (R4)$$
$$N_{\sigma,1,3}(x_n, y_n, z_n)B_n + N_{\sigma,1,4}(x_n, y_n, z_n)A_n B_n$$

$$B_{n+1} = N_{\sigma,2,1}(x_n, y_n, z_n) \times 1 + N_{\sigma,2,2}(x_n, y_n, z_n)A_n + \qquad (R5)$$
$$N_{\sigma,2,3}(x_n, y_n, z_n)B_n + N_{\sigma,2,4}(x_n, y_n, z_n)A_n B_n$$

-continued
$$A_{n+1}B_{n+1} = N_{\sigma,3,1}(x_n, y_n, z_n) \times 1 + N_{\sigma,3,2}(x_n, y_n, z_n)A_n + \qquad (R6)$$
$$N_{\sigma,3,3}(x_n, y_n, z_n)B_n + N_{\sigma,3,4}(x_n, y_n, z_n)A_n B_n$$

where:
the matrix $N_\sigma$ is a 3×4 matrix whose coefficients $N_{n,i,j}$ (with $1 \le i \le 3$ and $1 \le j \le 4$) are polynomials of three variables x, y and z with integer coefficients, and $TrA_n = x_n$, $TrB_n = y_n$, and $TrA_n B_n = z_n$ are respectively the trace of the matrix $A_n$, the trace of the matrix $B_n$, and the trace of the matrix $A_n B_n$.

A procedure for determining the polynomials $N_{\sigma, i,j}$, the coefficients of $N_\sigma$, is presented in:

D8: J. Peyriére, On an article by W. Magnus on the Fricke characters of free groups. J. of Algebra 228 (2000), 659-673, D9: J. Peyriére, Polynomial dynamical systems associated with substitutions. In Substitutions in Dynamics, Arithmetics and Combinatorics. Eds. V. Berthé, S. Ferenczi, C. Mauduit, and A. Siegel. Lecture Notes in Mathematics 1794. Springer 2002, p.321-342. ISSN 0075-8434, ISBN 3-540-44141-7.)

Relations R4, R5 and R6 may be written in the form:

$$\begin{pmatrix} A_{n+1} \\ B_{n+1} \\ A_{n+1}B_{n+1} \end{pmatrix} = N_\sigma(x_n, y_n, z_n) \begin{pmatrix} I \\ A_n \\ B_n \\ A_n B_n \end{pmatrix} \qquad (R7)$$

where I denotes the unit matrix of order 2.

It is seen that in this specific example the matrix $M_N = A_n$ is representative of the heterostructure comprising N layers obtained after n substitutions of the substitutive sequence $\sigma$.

The method uses the trace and the antitrace of the matrices of relation (R7). We thus obtain, for the trace:

$$\begin{pmatrix} x_{n+1} \\ y_{n+1} \\ z_{n+1} \end{pmatrix} = N_\sigma(x_n, y_n, z_n) \begin{pmatrix} 2 \\ x_n \\ y_n \\ z_n \end{pmatrix} \qquad (R8)$$

and for the antitrace, denoted by "aTr":

$$\begin{pmatrix} aTrA_{n+1} \\ aTrB_{n+1} \\ aTrA_{n+1}B_{n+1} \end{pmatrix} = N_\sigma(x_n, y_n, z_n) \begin{pmatrix} 0 \\ aTrA_n \\ aTrB_n \\ aTrA_n B_n \end{pmatrix} \qquad (R9)$$

Relation (R8) is called the trace mapping. It allows the calculation of $x_n$, $y_n$, and $z_n$ by recurrence, and relation (R9) that of the antitraces.

The useful details may be found in

D10: J.-P. Allouche, J. Peyriére, Sur une formule de récurrence sur les traces de produits de matrices associés à certaines substitutions. [On a recurrence formula on the traces of matrix products associated with certain substitutions] C. R. Acad. Sc. Paris, v. 302, Series II, (1986) No. 18, p. 1135, D11: J. Peyriére, Trace maps. In Beyond Quasicrystals. Eds. F. Axel and D. Gratias. Editions de Physique and Springer, 1995, p. 465-480).

It is therefore seen that the BBR contains the trace mapping, but it is more powerful and indispensable, in the sense that it affords access to all the combinations of coefficients of $A_n$ and $B_n$ and not only to their traces.

Relations (R4) to (R9) hereinabove are general in the sense that they are not limited to a particular substitutive sequence, but on the contrary apply to any substitutive sequence constructed with the help of an alphabet of two letters a and b.

However, still following our example, in which each letter a is replaced with the substitution word $\sigma_a$=aab, and each letter b is replaced with the substitution word $\sigma_b$=ba, it is seen that relations (R4) to (R6) may be written:

$$A_{n+1} = -B_n + x_n A_n B_n \tag{R10}$$

$$B_{n+1} = (z_n - x_n y_n) \times 1 + y_n A_n + x_n B_n - A_n B_n \tag{R11}$$

$$A_{n+1} B n + 1 = (x_n - y_n z_n) \times 1 + (x_n y_n z_n - x_n^2 - y_n^2 + 1) A_n + y_n A_n B_n \tag{R12}$$

where $x_n$, $y_n$ and $z_n$ are the traces of $A_n$, $B_n$ and $A_n B_n$, thus making it possible to obtain for the 3×4 matrix $N_\sigma$ $$N_\sigma(x_n, y_n, z_n) = \begin{pmatrix} 0 & 0 & -1 & x_n \\ z_n - x_n y_n & y_n & x_n & -1 \\ x_n - y_n z_n & x_n y_n z_n - x_n^2 - y_n^2 + 1 & 0 & y_n \end{pmatrix} \tag{R13}$$

The product of all the elementary matrices is then calculated by means of this block-wise recurrence and according to their arrangement, so as to obtain the matrix $M_N = A_n$ in the example which allows the following calculation of the transmission coefficient T of the structure $$T = \frac{4}{((TrM_n)^2 + (aTrM_n)^2)} \tag{R3}$$

thus completing the description allowing the implementation of the method in the case of the example.

Finally, the use of the block-wise recurrence (BBR) technique can obviously be generalized to an alphabet comprising k letters $a_1, a_2, \ldots, a_k$. These various letters are then representative of the k layers of a heterostructure that may differ from one another in their composition and/or their thickness.

With the help of a substitution $\sigma$ on this alphabet: if $A_1$, $A_2, \ldots, A_k$ are square matrices of order 2 and of determinant 1, we consider, for each j lying between 1 and k, and for all n≥0, the matrix $A_j$,n obtained by replacing each letter $a_i$ (for i=1,2, . . . , k) in the word $\sigma^n(a_j)$ by $A_i$.

For each sequence J=($j_1, j_2, \ldots, j_v$) such that 1≤v≤k and 1≤$j_1$<$j_2$<$j_v$≤k (there are $2^k-1$ such sequences), we put $A_{J, n} = A_{j1, n} A_{j2, n} \cdots A_{jv, n}$.

Then, the matrices $A_{J, n+1}$ are linear combinations of I, the unit matrix of order 2, and of the matrices $A_{J, n}$. The coefficients of these relations being polynomials in the traces of the matrices $A_{J, n}$.

It is possible to obtain formulae with fewer terms if it is accepted that the coefficients are no longer polynomials, but rational fractions. But these new formulae do not afford any appreciable advantage during the numerical calculations, at least if the alphabet has few letters.

Once the matrix $M_n$ (with reference to R2) is known, the propagation of the light through the heterostructure is confirmed by calculating the transmission coefficient T of the N layers of the heterostructure through the formula:

$$T = \frac{4}{((TrM_n)^2 + (aTrM_n)^2)} \tag{R3}$$

Once this calculation has been performed, the value of the transmission coefficient of the structure obtained is compared with a threshold value $T_{thresh}$, below which it is considered that the structure is a mirror.

The threshold value $T_{thresh}$ will for example be defined by the value zero with an approximation of the order of $10^{-5}$, for any value of the angle of incidence. For certain applications, the threshold value will be defined by the value 0.02 or even 0.05.

With the method proposed by the invention, it therefore becomes possible to produce an omnidirectional multilayer non-metallic mirror adapted for a given application, without any prior constraint on the physical parameters involved in this structuring, by performing numerous calculations with various thicknesses of layers taken arbitrarily, in a reasonable time and with current calculation means. The rounding errors generated by these calculations thus now have no impact on the result.

Moreover, it has also been demonstrated that it was possible to obtain omnidirectional mirrors with lower thicknesses of layers than those proposed currently with a periodic multilayer non-metallic mirror. It is understood that this structuring is very advantageous when proceeding to the manufacturing step.

Manufacture is done by means of the conventional technologies of depositing layers by MBE (molecular beam epitaxy) or by sputtering, these being well mastered commonplace techniques.

The method according to the invention is therefore very general, and does not place any a priori conditions on the nature of the substitution $\sigma$, on the values of the thicknesses of the layers $a_1, a_2, \ldots, a_k$, or moreover on the set of physical parameters: wavelength $\lambda$, angle of incidence $\theta$, thicknesses and refractive indices of the layers.

Other characteristics of the invention are:
- The heterostructure may be obtained with the help of a single substitutive sequence, in such a way that each layer is a simple layer of a single material
- The heterostructure may be obtained with the help of a single substitutive sequence, in such a way that each layer is the assemblage of elementary layers which themselves have a structure
- The heterostructure may be obtained with the help of several substitutive sequences, in such a way that the heterostructure consists of several subsets of layers, each layer being obtained through a substitutive sequence.

The invention claimed is:

1. An omnidirectional nonmetallic mirror custom made to be omnidirectional within a range from $\theta_1$ to $\theta_2$, wherein $\theta_1$ and $\theta_2$ are each a value in the range of 0 to 90 degrees and selected before the omnidirectional nonmetallic mirror is prepared by a process comprising the steps of:
A) defining a base structure including at least two layers, layer a and layer b, made of different non-metallic materials, layer a and layer b being each associated with an elementary matrix incorporating physical parameters of the layer and parameters of light passing through the layer, the physical parameters including thickness $d_a$ of layer a, thickness $d_b$ of layer b, refractive index $n_a$ of layer a and refractive index $n_b$ of layer b, the parameters of the incident light including wavelength $\lambda$, angle of incidence $\theta$, TE mode and TM mode;

B) defining a heterostructure by applying a selected substitution $\sigma$ to the base structure, the substitution $\sigma$ replacing one layer in the base structure with a predetermined combination of layer a and layer b, the heterostructure defined by the iterated action of $\sigma$ having a total of N layers with each layer j being associated with its transfer matrix $S_j$ incorporating the physical parameters of layer j and the parameters for light passing through layer j where j is 1 to N;

C) calculating a product of matrices $$M_N = S_N S_{N-1} S_{N-2} \ldots S_2 S_1$$

with a computer by a block-wise recurrence defined by $\sigma$ and according to their arrangement by means of the block-wise recurrence to obtain the transfer matrix $M_N$ of the heterostructure defined in step B, from which the heterostructure transmission coefficient T is calculated also by the computer with the formula:

$$T = \frac{4}{(TrM_N)^2 + (aTrM_N)^2}$$

where $TrM_N$ is the trace of the matrix $M_N$ and $aTrM_N$ its antitrace;

D) comparing the transmission coefficient T so obtained with a threshold value $T_{thresh}$ predetermined in view of the envisaged use of the mirror and
   if the transmission coefficient T is below the threshold value $T_{thresh}$, for any angle of incidence $\theta$ between $\theta_1$ and $\theta_2$, at the wavelength or over a span of wavelengths being considered, for the TE mode and for the TM mode, the structure is an omnidirectional mirror for the light having an angle of incidence $\theta$ lying between $\theta_1$ and $\theta_2$,
   if the transmission coefficient T is above the threshold value $T_{thresh}$ for at least one angle of incidence $\theta$ lying between $\theta_1$ to $\theta_2$, at the wavelength or in the span of wavelengths considered, either for the TE mode, or for the TM mode, identifying the heterostructure as not being an omnidirectional non-metallic mirror and then:
      defining another heterostructure by step B with a new substitution $\sigma$ and repeating steps C and D until a non-metallic omnidirectional mirror is obtained, or
      defining another base structure in step A and repeating steps B, C, and D; and E) if a non-metallic omnidirectional mirror is identified in step D depositing N layers to form the omnidirectional non-metallic mirror.

2. The omnidirectional nonmetallic mirror of claim 1, wherein the base structure defined in step A includes a structure comprising k layers $a_j$ with $1 \leq j \leq k$ of nonmetallic materials that may differ in composition and/or thickness.

3. The omnidirectional nonmetallic mirror of claim 2, wherein the heterostructure of step B is obtained with a single substitutive sequence, each non-metallic material layer being a simple layer made of a single material.

4. The omnidirectional nonmetallic mirror of claim 2, wherein the heterostructure of step B is obtained with a single substitutive sequence applied to a set of layers, in which each layer is itself an assembly of simple layers, each simple layer being made of a single material.

5. The omnidirectional nonmetallic mirror of claim 2, wherein the heterostructure of step B is obtained with several substitutive sequences, so that the structure is formed of several subsets of simple layers, each made of a single material, each subset being obtained using a substitutive sequence.

6. The omnidirectional nonmetallic mirror of claim 2, wherein the heterostructure of step B comprises at least one subset of layers whose disposition is obtained by composition of substitutions.

7. The omnidirectional nonmetallic mirror of claim 2, wherein the heterostructure of step B comprises a structure obtained using several substitutive sequences, so that the heterostructure is formed of several subsets of simple layers, each subset being obtained using a substitutive sequence.

8. The omnidirectional nonmetallic mirror of claim 2, wherein the heterostructure of step B comprises a structure obtained using several substitutive sequences, so that the heterostructure of step B is formed of several subsets of simple layers, each subset being obtained using a substitutive sequence, said subsets being assembled using another substitutive sequence.

9. The omnidirectional nonmetallic mirror of claim 2, wherein:
   the $M_N$ product is implemented by multiplying blocks of the elementary matrices determined by means of a blockwise recursion relation or building block recurrence BBR, specifically defined by $\sigma$ instead of making their direct product; and
   the transfer matrix associated with the (n+1)th iterate of $\sigma$ starting from $a_j$ with $1 \leq j \leq k$ is a product of k types of transfer matrices, each obtained from the nth iterate of $\sigma$ acting on one of the $a_j$ with $1 \leq j \leq k$.

10. The omnidirectional nonmetallic mirror of claim 1, wherein the heterostructure of step B is obtained with a single substitutive sequence, each non-metallic material layer being a simple layer made of a single material.

11. The omnidirectional nonmetallic mirror of claim 1, wherein the heterostructure of step B is obtained with a single substitutive sequence applied to a set of layers, in which each layer is itself an assembly of simple layers, each simple layer being made of a single material.

12. The omnidirectional nonmetallic mirror of claim 1, wherein the heterostructure of step B is obtained with several substitutive sequences, so that the structure is formed of several subsets of simple layers, each made of a single material, each subset being obtained using a substitutive sequence.

13. The omnidirectional nonmetallic mirror of claim 1, wherein the heterostructure of step B comprises at least one subset of layers whose disposition is obtained by composition of substitutions.

14. The omnidirectional nonmetallic mirror of claim 1, wherein the heterostructure of step B, comprises a structure obtained using several substitutive sequences, so that the heterostructure is formed of several subsets of simple layers, each subset being obtained using a substitutive sequence.

15. The omnidirectional nonmetallic mirror of claim 1, wherein the heterostructure of step B comprises a structure obtained using several substitutive sequences, so that the heterostructure of step B is formed of several subsets of simple layers, each subset being obtained using a substitutive sequence, said subsets being assembled using another substitutive sequence.

16. The omnidirectional nonmetallic mirror of claim 1, wherein:
the $M_N$ product is implemented by multiplying blocks of the elementary matrices determined by means of a blockwise recursion relation or building block recurrence BBR, specifically defined by σ instead of making their direct product; and
the transfer matrix associated with the (n+1)th iterate of σ starting from a is a product of two types of transfer matrices, the first obtained from the nth iterate of σ acting on a and the second obtained from the nth iterate of σ acting on b.

17. The omnidirectional nonmetallic mirror of claim 1, wherein $θ_1$ is equal to zero degrees and $θ_2$ is equal to ninety degrees.

18. A custom omnidirectional nonmetallic mirror comprising:
a total of N layers and a transmission coefficient T below a threshold value $T_{thresh}$ predetermined in view of an envisaged use of said mirror for any angle of incidence θ between $θ_1$ and $θ_2$, at a wavelength λ or over a span of wavelengths being considered, for the TE mode and for the TM mode, wherein $θ_1$ and $θ_2$ are each a value in the range of 0 to 90 degrees and selected before the custom omnidirectional nonmetallic mirror is prepared and said mirror is prepared by a process comprising the steps of:
A) defining a base structure including at least two layers, layer a and layer b, made of different nonmetallic materials, layer a and layer b being each associated with an elementary matrix incorporating physical parameters of the layer and parameters of light passing through the layer, the physical parameters including thickness $d_a$ of layer a, thickness $d_b$ of layer b, refractive index $n_a$ of layer a and refractive index $n_b$ of layer b, the parameters of the incident light including wavelength λ, angle of incidence θ, TE mode and TM mode;
B) defining a heterostructure by applying a selected substitution σ to the base structure, the substitution σ replacing one layer in the base structure with a predetermined combination of layer a and layer b, the heterostructure defined by the iterated action of σ having a total of N layers with each layer j being associated with its transfer matrix $S_j$ incorporating the physical parameters of layer j and the parameters for light passing through layer j where j is 1 to N;
C) calculating a product of matrices
$$M_N = S_N S_{N-1} S_{N-2} \ldots S_2 S_1$$
with a computer by a block-wise recurrence defined by σ and according to their arrangement by means of the block-wise recurrence to obtain the transfer matrix $M_N$ of the heterostructure defined in step B, from which the heterostructure transmission coefficient T is calculated also by the computer with the formula:

$$T = \frac{4}{(TrM_N)^2 + (aTrM_N)^2}$$

where $TrM_N$ is the trace of the matrix $M_N$ and $aTrM_N$ its antitrace;
D) comparing the transmission coefficient T so obtained with the threshold value $T_{thresh}$ predetermined in view of the envisaged use of the mirror and
if the transmission coefficient T is below the threshold value $T_{thresh}$, for any angle of incidence θ between $θ_1$ and $θ_2$, at the wavelength or over a span of wavelengths being considered, for the TE mode and for the TM mode, the structure is an omnidirectional mirror for the light having an angle of incidence θ lying between $θ_1$ and $θ_2$,
if the transmission coefficient T is above the threshold value $T_{thresh}$ for at least one angle of incidence θ lying between $θ_1$ to $θ_2$, at the wavelength or in the span of wavelengths considered, either for the TE mode, or for the TM mode, identifying the heterostructure as not being an omnidirectional non-metallic mirror and then:
defining another heterostructure by step B with a new substitution σ and repeating steps C and D until a non-metallic omnidirectional mirror is obtained, or
defining another base structure in step A and repeating steps B, C, and D; and
E) if a non-metallic omnidirectional mirror is identified in step D depositing N layers to form the custom omnidirectional non-metallic mirror.

19. The custom omnidirectional nonmetallic mirror of claim 18, wherein $θ_1$ is equal to zero degrees and $θ_2$ is equal to ninety degrees.

* * * * *